United States Patent [19]

Osborn et al.

[11] 3,910,865
[45] Oct. 7, 1975

[54] SYNTHETIC RESIN OF STYRENE, ISOBUTYLENE AND 1,3-BUTADIENE

[75] Inventors: Robert A. Osborn, Stow; Herbert L. Bullard, Norton Village, both of Ohio

[73] Assignee: The Goodyear Tire & Rubber Company, Akron, Ohio

[22] Filed: May 13, 1974

[21] Appl. No.: 469,262

[52] U.S. Cl..... 260/80.7; 260/29.6 T; 260/33.6 PQ; 260/33.6 UA; 260/889; 260/901; 428/272; 428/507; 428/538
[51] Int. Cl.² .................................... C08F 236/04
[58] Field of Search ........ 260/80.7, 29.7 T, 29.6 T, 260/29.6 TA, 33.6 PQ, 33.6 UA

[56] References Cited
UNITED STATES PATENTS
2,631,953   3/1953   Hubbard et al................. 260/80.7
FOREIGN PATENTS OR APPLICATIONS
106,371   7/1938   Australia........................... 260/80.7

Primary Examiner—Murray Tillman
Assistant Examiner—J. Ziegler
Attorney, Agent, or Firm—F. W. Brunner; H. C. Young, Jr.

[57] ABSTRACT

A resinous material, suitable for use in hot melt adhesives, having a softening point in the range of about 60°C to about 110°C prepared by polymerizing a monomer mixture selected from specific amounts of styrene, isobutylene and 1,3-butadiene, where the mole ratio of isobutylene to butadiene is in the range of about 0.5/1 to about 3/1. The resinous material itself is prepared by polymerizing the selected monomers and their required amounts in the presence of a catalyst selected from aluminum chloride and ethylaluminum dichloride and in the presence of a hydrocarbon solvent containing dissolved water.

1 Claim, No Drawings

SYNTHETIC RESIN OF STYRENE, ISOBUTYLENE AND 1,3-BUTADIENE

This invention relates to synthetic resins and to a method of preparing such resins. In particular, this invention relates to the preparation of a resinous polymer comprising units derived from styrene, isobutylene and 1,3-butadiene.

It is well-known that copolymers of isobutylene and a diolefin such as isoprene or 1,3-butadiene can be rubbery in nature when prepared at low temperatures. It is further known that copolymers of butadiene and styrene can be rubbery or resinous in nature. Copolymers of styrene and isobutylene are taught to be resinous and suitable for use in hot melt pressure sensitive adhesives when having a high styrene content and when mixed with other selected copolymers.

It is an object of this invention to provide a new thermoplastic resin from a combination of the monoolefin, isobutylene, the diolefin, 1,3-butadiene and the aromatic compound, styrene.

In accordance with this invention, it has been discovered that a resinous composition having a softening point in the range of about 60° to about 110°C according to ASTM E28–58T is prepared by polymerizing a monomer mixture comprising from about 45 to about 70 weight percent styrene, from about 10 to about 35 weight percent isobutylene and about 8 to about 35 weight percent 1,3-butadiene, where the weight ratio of isobutylene to butadiene is in the range of about 0.5/1 to about 3/1 in the presence of a catalyst selected from aluminum chloride and ethylaluminum dichloride, and in the presence of a solvent selected from aromatic hydrocarbons containing 6 to 8 carbon atoms and saturated aliphatic hydrocarbons containing 3 to 7 carbon atoms, said solvent containing dissolved water in an amount of about 50 to about 200 parts per million by weight based on said solvent but not exceeding the solvent's saturation level.

In the preferred practice of this invention, the resinous material is characterized by having a softening point of about 70° to about 100°C and is prepared by polymerizing a monomer mixture comprising about 50 to about 65 weight percent styrene, about 20 to about 30 weight percent isobutylene and about 10 to about 25 weight percent 1,3-butadiene, where the mole ratio of isobutylene to butadiene is in the range of about 1/1 to about 2.5/1 in the presence of aromatic hydrocarbons selected from benzene, toluene, xylene and tetralin and saturated aliphatic hydrocarbons selected from propane, butane, pentane, hexane and heptane, said solvent containing dissolved water in an amount of about 50 to about 150 parts per million based on said solvent, but not exceeding the solvent's saturation level.

The resin composition of this invention is particularly characterized by comprising about 50 to about 75, preferably about 55 to about 72, weight percent units derived from styrene, about 15 to about 40, preferably about 25 to about 35, weight percent units derived from isobutylene and about 5 to about 30, preferably about 7 to about 20, weight percent units derived from 1,3-butadiene where the weight ratio of isobutylene to butadiene is in the range of about 0.6/1 to about 4/1 and preferably about 1.2/1 to about 3.5/1.

It was an important discovery of this invention that the 1,3-butadiene component provides a structure that substantially reduces the amount of styrene required to achieve a resin having the same characterized softening point.

With regard to the water content of the solvent, it is indeed required that some water be present. However, it is likewise required that the reaction be maintained in single phase with regard to the solvent, and not as separate phases of solvent and water. Thus, it is a specific requirement of this invention that the amount of water in the solvent itself should not exceed the solvent's saturation level in order to maintain a single phase relationship of the reaction system as regards the solvent itself.

The resinous materials prepared according to the practice of this invention are typically light in color with a Gardener color of less than 2 and preferably less than about 1. Thus, the resins range in color from a very slightly yellow color to practically water white. The resins can be characterized by having good heat stability and by their resistance to permeation by water. Thus, they are useful as moisture barriers for various materials.

In carrying out the polymerization reaction, the mixture of monomers is brought into contact with the catalyst in the presence of the solvent. An aliphatic hydrocarbon solvent is preferred for the preparation of lighter color resins. If the catalyst is used in a liquid or a particulate form, it can simply be contacted with the monomers in solution. Although ethyl aluminum dichloride is preferred, when a particulate aluminum trichloride catalyst is used, it typically has a particle range from about 5 to about 200 mesh size, although larger or smaller parts can be used. Although the amount of aluminum catalyst is generally not a critical feature of this invention, sufficient amount of catalyst is to be added to effect the polymerization. The catalyst can be added to the monomer mixture or the monomer mixture may be added to the catalyst. The reaction can be conducted on a continuous basis or by batch process techniques generally known to those skilled in the art.

The polymerization reaction is conveniently carried out in the presence of a solvent or diluent because it is exothermic in nature. Usually the polymerizate or polymerization mixture contains about 40 to about 50 weight percent monomers and, correspondingly, about 60 to about 40 weight percent solvent. However, with adequate mixing and cooling, the temperature can be controlled and the reaction conducted without a diluent. Various diluents or solvents can be used which are inert in that they do not enter into the polymerization reaction. Representative of various preferred diluents are aromatic hydrocarbons such as toluene and benzene and aliphatic hydrocarbons such as pentane, hexane and heptane. In the practice of this invention, it is preferred that the polymerization reaction be carried out at a temperature in the range of about 0° to about 30°C and more preferably in the range of about 20° to about 30°C. A temperature of about 25° to about 30°C is particularly useful with slow addition of the volatile reactants. Thus it is particularly preferred that the monomers be added to the reaction essentially simultaneously and slowly enough that essentially no unreacted isobutylene and styrene monomers are allowed to accumulate in the reaction mixture. The polymerization pressure can be atmospheric or above or below atmospheric pressure. However, if higher reaction temperatures are desired, the polymerization will have to be conducted under a pressure greater than atmospheric and/or a very substantial reflux means must be provided. It is generally preferred that the reaction be conducted under the autogeneous pressure developed by the reactants under the operating conditions used. The time of the reaction can vary considerably such as from a few seconds to 4 to 5 hours or more.

The resin of this invention can be used as a valuable additive to various thermoplastic polymers where moisture retention or exclusion is desired. For example, the resin can be mixed with a thermoplastic polymer, such as a styrene/acrylate copolymer resin and the admixture used as a film for curing concrete or cement. The addition of the resin both lowers the viscosity of the thermoplastic itself without diluting its moisture barrier characteristics. In such an application of a concrete curing membrane, the thermoplastic/resin mixture is applied over freshly poured concrete in order to retain the moisture within the concrete itself so that is will cure more properly.

The resin can be useful as a sizing additive for paper and fabrics.

The resin of this invention can also be used as a tackifier for adhesives. It can be particularly useful in hot melt adhesives when a mixture is provided which comprises 100 parts of a copolymer selected from copolymers of ethylene and vinyl acetate, of ethylene and alkyl acrylate, of vinyl acetate and acrylic acid and of terpolymers of ethylene and vinyl acetate and methacrylic acid and, in admixture therewith, about 20 to about 100 parts by weight of the resin of this invention. The resulting mixture can be suitably applied to a substrate by first recovering in a suitable solvent, applying the resulting solution as a coating, and drying the coating. When used as a hot melt adhesive, it can be more suitably applied to a substrate by mixing with one of the indicated copolymers and applying to a substrate at an elevated temperature, such as about 80° to about 150°C and cooled.

The following examples further illustrates this invention and are not intended to be limiting. In this example, the parts and percentages are by weight unless otherwise indicated.

EXAMPLE I

To a reactor fitted with a stirrer, dry-ice condenser, thremometer and a nitrogen charge system, after purging with nitrogen, was charged with 100 parts of heptane. To the heptane was added about 5 parts of a 25 percent solution of ethylaluminum dichloride in heptane. The heptane itself was estimated to contain about 50 to about 100 parts per million water. While maintaining agitation of the mixture by stirring, a monomer mixture was slowly added to the reactor over a period of about 1 hour. The monomer mixture was cooled with a salt/ice bath and the reaction temperature of the reacting mixture was maintained in the range of about 17° to about 20°C. After addition to the monomer mixture, the reaction mixture was continually stirred for an additional 1½ hours. The catalyst was deactivated with the addition of about 4 parts methanol and the resulting solution filtered to remove solid particles.

The filtrate was distilled under nitrogen to a pot temperature of about 245°C and the collected distillate analyzed. The resulting resin was dissolved in heptane and filtered to remove any residual catalyst components. An additional distillation was carried out with the aid of steam. This steam distillation was continued until 2 parts water had been collected for one part resin. The collected resin was analyzed to have a softening point of 83.5°C according to ASTM E28–58T. In this reaction, 292 parts of resin, distillate and oil was recovered from the 307 parts charged monomer, solvent, catalyst and methanol thereby resulting in a 96.2 percent material balance.

In this reaction, the 220 parts of monomer had an analysis shown in Table 1.

TABLE 1

|  | Monomer Percent | Parts |
|---|---|---|
| butane | 0.3 | 0.6 |
| isobutylene | 21.1 | 42.2 |
| t-2-butene | 2.2 | 4.4 |
| 1,3-butadiene | 10.8 | 21.6 |
| 1,2-butadiene | 0.1 | 0.2 |
| styrene | 60.0 | 120.0 |
| others | 5.5 | 11.0 |

The material balance for the reaction is more clearly shown in the following Table 2 which demonstrates the overall amounts of starting material and collected material.

TABLE 2

| Starting material Parts | Collected material Parts |
|---|---|
| 200 monomer | 121 distillate |
| 100 heptane | 168 resin |
| 3 (5 ml) EADC (in 25% heptane) | 3 oil |
| 4 (5 cc) methanol |  |
| 307    TOTAL | 292 |

The following Table 3 more clearly shows the composition of the recovered resin based upon a comparison of the material balance and an analysis of the starting and finishing materials.

TABLE 3

|  | Distillate % | Parts | Resin % | Parts |
|---|---|---|---|---|
| butane | .1 | .8 | — | — |
| isobutylene | 3.0 | 3.6 | 21.5 | 38.6 |
| t-2-butene | 3.1 | 3.9 | 0.3 | 0.5 |
| 1,3-butadiene | 6.2 | 7.5 | 7.9 | 14.1 |
| 1,2-butadiene | 0.1 | 0.1 | — | 0.1 |
| styrene | 1.4 | 1.7 | 66.1 | 118.3 |
| others | 2.9 | 3.5 | 4.2 | 7.5 |

EXAMPLE II

A series of resinous copolymers of 1,3-butadiene, styrene and isobutylene was prepared according to the following method and identified herein as Experiments A–G. To a reactor was charged heptane solvent, except for hexane in Experiments C and D, water and ethylaluminum dichloride. An overall concentration of the aluminum catalyst was about 0.5 percent. The mixture was stirred in order to adequately mix the reactants. The 1,3-butadiene (used in Experiments F and G), styrene and isobutylene monomers were rather slowly added simultaneously over a period of time in order to maintain essentially no unreacted styrene and isobutylene monomers and the mixture allowed to further react for an additional length of time after all of the monomers had been added. The catalyst was then deactivated with methanol and lime. The resulting resin solution was filtered and the filtrate distilled to remove solvent and unreacted monomer. The resulting recovered resin was then analyzed to determine its softening point according to ASTM E28-58T.

TABLE 1

| Exp No. | Styrene/ Isobutylene Parts Ratio | | Mol % of water based upon moles of aluminum catalyst | Polym Temp °C | Monomer Addition Time (Min) | Total Reaction Time (Min) | % Resin Yield | Resin Softening Point °C |
|---|---|---|---|---|---|---|---|---|
| A | 70/30 | | 5 | 15-20 | 90 | 60 | 91 | 68 |
| B | 70/30 | | 5 | 15-20 | 90 | 60 | 87 | 75 |
| C | 70/30 | | 5 | 20 | 30 | 60 | 96 | 78 |
| D | 70/30 | | 5 | 20 | 60 | 60 | 93 | 73 |
| E | 70/30 | | 35 | 15-20 | 60 | 45 | 65 | 78 |
|   | Sty/ Iso | 1,3 Bd | | | | | | |
| F | 60/20 | 20 | 7 | 15 | 90 | 60 | 73 | 97 |
| G | 60/20 | 20 | 7 | 15 | 105 | 45 | 80 | 95 |

EXAMPLE III

To a reactor was charged 68 parts heptane and 3 parts aluminum trichloride. One hundred parts of a monomer mixture containing styrene, isobutylene and 1,3-butadiene was slowly added to the reactor over a period of 1½ hours with the temperature of the reactor maintained at about 10° to about 15°C. After an extra 1 hour reaction time, the catalyst was deactivated with 6.5 parts methanol and 10 parts lime. The resin solution was filtered and steam distilled to the extent of a water/resin ratio of about 2.6/1 to revover 146 parts resin having a softening point of about 74°C and 6 parts of an oil. The overall yield of resin was calculated to be about 73 percent.

The monomer mixture for this invention contained about 50 percent styrene and 50 percent of a monomer mixture containing about 27 percent butadiene, about 54 percent isobutylene and about 19 percent other hydrocarbons generally containing about 4 to 5 carbon atoms.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a resinous material, characterized by having a softening point in the range of about 70° to about 100°C, which comprises polymerizing at a temperature in the range of about 20° to about 30°C a monomer mixture comprised of about 50 to about 65 weight percent styrene, about 20 to about 30 weight percent isobutylene and about 10 to about 25 weight percent 1,3-butadiene, where the mole ratio of isobutylene to butadiene is in the range of about 1/1 to about 2.5/1, in the presence of a catalytic amount of a catalyst selected from aluminum chloride and ethyl aluminum dichloride and, in the presence of an organic solvent containing dissolved water in an amount of about 50 to about 150 parts per million based on said solvent, but not exceeding the solvent's saturation level, where, after the reaction has begun, any additional styrene, isobutylene and 1,3-butadiene are added sufficiently slowly so that essentially no unreacted isobutylene and styrene monomers are allowed to accumulate in the reaction mixture, where the overall polymerizate contains about 60 to about 40 weight percent of said solvent selected from at least one of benzene, toluene, xylene, pentane, hexane and heptane and where said resinous material is recovered by first deactivating the catalyst with a material selected from an alcohol and lime followed by filtering and steam distilling the product to remove liquids therefrom.

* * * * *